F. E. & E. F. MILLS.
PRESSURE TRANSMITTING CONTROLLER.
APPLICATION FILED OCT. 1, 1914.
1,136,478.
Patented Apr. 20, 1915.
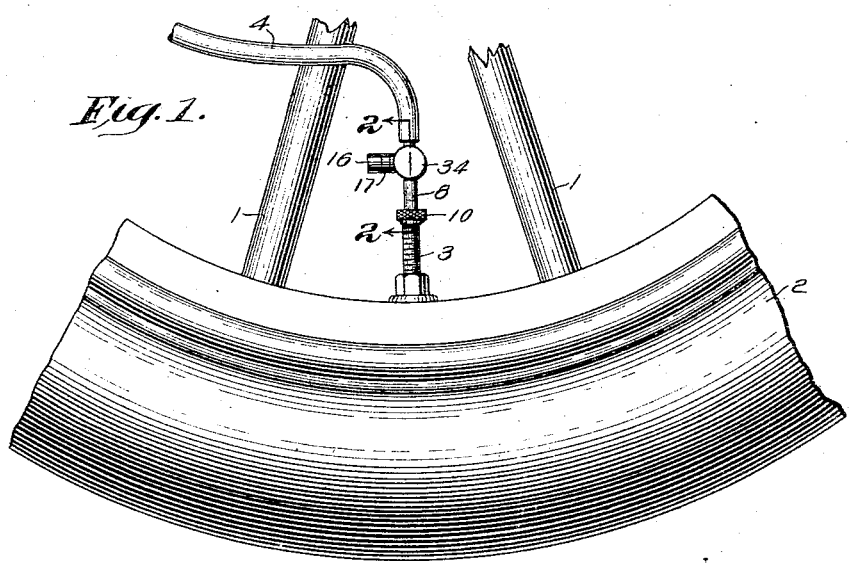
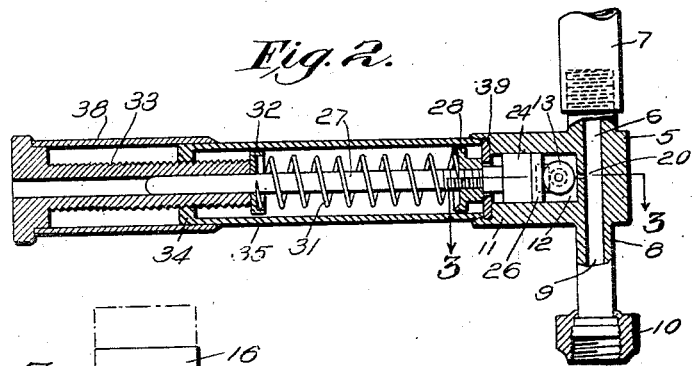
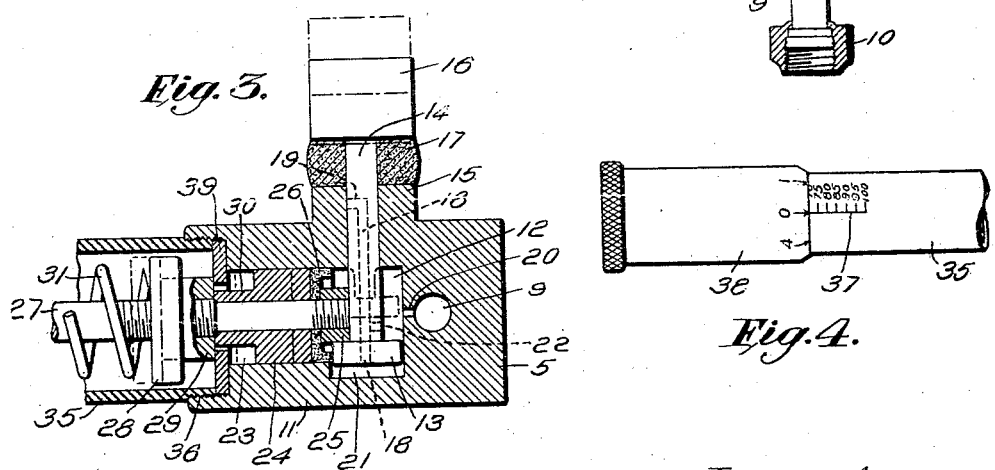
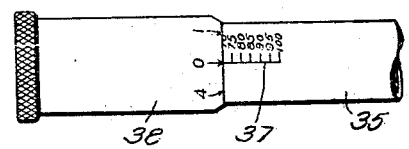
Witnesses,
Inventors,
Francis E. Mills
Edward F. Mills

UNITED STATES PATENT OFFICE.

FRANCIS E. MILLS AND EDWARD F. MILLS, OF BOSTON, MASSACHUSETTS.

PRESSURE-TRANSMITTING CONTROLLER.

1,136,478.  Specification of Letters Patent.  Patented Apr. 20, 1915.

Application filed October 1, 1914. Serial No. 864,422.

*To all whom it may concern:*

Be it known that we, FRANCIS E. MILLS and EDWARD F. MILLS, citizens of the United States, residing in Boston, county of Suffolk, State of Massachusetts, have invented an Improvement in Pressure-Transmitting Controllers, of which the following description, in connection with the accompanying drawings, is a specification, like letters on the drawings representing like parts.

The invention to be hereinafter described relates to pressure transmitting controllers for automatically determining the pressure of fluid that shall be transmitted to a container from a source of fluid supply.

As well known by those skilled in the art, it is now the common practice to inflate pneumatic tires by means of an air supply under high pressure or an air pump driven by power and connected to the valve cylinder of the tire by means of a flexible tube. For the best results pneumatic tires should be inflated to a predetermined pressure dependent upon the character or size of the tire itself, and as one means to this end, it has been proposed to provide the tube connecting the source of air supply or pump and tire with a gage, so that when the pressure has reached a predetermined amount, the attendant may stop the continued supply of air to the tire. Obviously, the attendant must watch the gage and stop the inflow of air to the tire when the desired pressure is reached. Should his attention be diverted and he neglect to do as stated serious injury to the tire is liable to result. With these general considerations in view, the aims and purposes of the present invention are to provide means whereby when the air in the tire or other receptacle has reached the desired pressure further inflow of air will be automatically stopped, all as will be more fully described in connection with the accompanying drawings showing one form of means for carrying the invention into practical effect, it being understood that the invention is not limited to the particulars of the means shown and described but in its true scope is definitely pointed out by the claims.

In the drawings:—Figure 1 is a side view, showing portions of a wheel with a pneumatic tire thereon and the connections between the source of air supply and the valve cylinder with the present invention interposed in said connection. Fig. 2 is an enlarged section on the line 2—2, Fig. 1. Fig. 3 is an enlarged section on the line 3—3, Fig. 2. Fig. 4 shows one practical form of scale to indicate the pressure to which the device of the present invention is adjusted.

While the invention is shown as associated with tire inflating means, and while the following description will set forth its use in exploitation of the invention, it is to be understood that the invention may be employed to automatically determine the pressure that will be transmitted to any receptacle into which it is desired to deliver a predetermined pressure. In the illustrated form of the invention, however, certain features are peculiarly adapted to the use of the device of the present invention for the inflation of pneumatic tires as will more fully appear.

The wheel 1 to which the pneumatic tire 2 may be applied, as indicated in Fig. 1 may be of any usual character and the tire may be secured thereon in any desired way. As well known by those skilled in the art, pneumatic tires are each provided with a valve cylinder 3 which projects through a portion of the wheel rim and contains the usual valve held to its seat by the pressure of the air within the tire. These features may be all as usual and being well understood by those skilled in the art need no further explanation. In order to inflate the pneumatic tire, the valve cylinder 3 is usually connected by a flexible tube 4 to a source of fluid or air pressure, such as a reservoir of compressed air or a pump. In the absence of some means to prevent undue inflation of the tire, it will be clear that unless the attendant is careful and watchful of the air inflow, serious injury may be done the tire by over inflation, or the tire may not be inflated to the desired predetermined extent. In this latter case, as will be readily understood, the tire is more readily susceptible to punctures.

To overcome both of the above difficulties the present invention contemplates the interposition of means, between the source of fluid pressure and the tire or other receptacle, which, when the tire or receptacle has been inflated to the desired predetermined amount will automatically stop further inflow of air thereto.

One form of means to the above ends is clearly indicated in Figs. 2 and 3, said means comprising a head 5, having an air-passage 6, to which may be connected the tube 7 leading from the source of fluid pressure supply. At the side of the head opposite the connection between the tube 7 and the passageway 6, said head has an extension 8, provided with a passageway 9, preferably in prolongation of the air-passage 6. On the end portion of the extension 8 is a coupling 10 adapted to connect the extension 8 with the valve cylinder 3 of the pneumatic tire or other receptacle.

Projecting from one side of the head 5 is a portion 11 having a chamber 12, Fig. 3, in which slides a piston or head 13, having a stem or rod extension 14 adapted to slide in an opening extending through the side portion 15 of the head. The stem or rod extension 14 is provided with an enlarged end portion 16 securely fixed thereto and between said head portion and the face of the portion 15 of the head is interposed a flexible washer, preferably of rubber 17. Extending longitudinally of the stem 14 is a vent 18, the outer end portion 19 of which is covered by the portion 15 of the head when the piston 13 and parts are in the position as indicated in Fig. 3, which position, for the purpose of identification and description, may be regarded as the normal position of the piston 13 and stem 14. Likewise, the piston 13 and stem 14 may for identification and description be hereinafter referred to as the transversely movable plunger. The passage-way 6 is in communication with the chamber 12 by means of a small vent or passage way 20, Fig. 3, and in order that the pressure of air in the passage-way 6 may readily find its way to the portion of the chamber 21 between the plunger 13 and the wall of the head, the rod extension or stem 14 is provided with a passage-way 22, leading into the longitudinal passage 18.

From the construction thus far described it will be apparent that if air pressure is produced in the passage-way 6 this pressure will be transmitted into the chamber 12 and into portion 21 of the chamber between the head 13 of the transversely movable plunger and the wall of the head, the construction being such that should the transversely movable plunger be free to move, such air pressure would cause movement thereof in a direction longitudinally of the stem 14, thereby exposing the outlet end portion 19 of the passage-way 18 beyond the face of the portion 15 of the head. Extending substantially at right angles to the chamber 12 is another chamber 23 in which is longitudinally movable a plunger or piston 24 having a locking portion 25 adapted to engage in front of the piston 13, as indicated in Fig. 3. In order to properly form an air-tight joint between the piston 24 and walls of chamber 23 a rubber or other yielding pack 26 may be employed, the locking portion 25 being preferably formed as an interiorly threaded nut circular in cross section to engage the screw threads of the exteriorly threaded rod 27.

Mounted upon rod 27 is a cap 28, having an extended portion 29, adapted to bear upon the extension 30 of the piston 24, the said cap 28 affording at one face a proper seat for one end of a spring 31, the other end of which spring is seated upon a loose cap piece 32, Fig. 2, the construction being such, as will more fully appear, that the expanding action of the spring 31 normally forces the piston 24, and, perforce the locking piece 25, into locking position, as indicated in Fig. 3, at which time, the locking piece 25 bears upon the inner surface of the piston 13 and prevents longitudinal movement of the stem 14. Should, however, the pressure of air in the chamber 12 rise sufficiently to overcome the tension of the spring 31, then such pressure of air upon the piston 24 will be sufficient to overcome the action of the spring and force the plunger 24 together with the locking piece 25 to the left, Fig. 3, thereby withdrawing the locking piece 25 from engagement with the piston 13, and allowing the latter together with stem 14 to move upwardly, Fig. 3, and uncover the open end 19 of the passage-way 18 in the stem 14. So long, however, as the parts remain in position as indicated by Fig. 3 the air transmitted to the passage-way 6, Fig. 2, will be directed through the passage-way 9 in the projection 8 and delivered to the tire or other receptacle, but when the piston 24 is moved by the accumulated pressure in the passage-way 6 and chamber 12, as above indicated, the transversely movable plunger or relief valve, as it may be termed, will be moved to open position and permit the air to escape by way of the vent or passage 18. In other words, when the pressure of air being delivered to the tire has reached a predetermined amount, the piston 24 will be moved to free the transversely movable plunger or relief valve and to thereafter permit the flow of fluid through the passage-way 6 to escape without further inflating the tire or other receptacle. Where the flexible tube 7 is connected to a pump the sudden impulses given to the air pressure in the passage-way 6 should not be permitted to exert their full impulsive force upon the top of the piston 24 but should be modified to maintain in the chamber 12 a substantially uniformly increasing pressure as determined by the air pressure in the tire. To this end the vent 20 leading from the passage-way 6 to the chamber 12 is made sufficiently small to check the impulse.

As herein before generally indicated, different characters or sizes of tires require different pneumatic pressures and to accommodate the device of the present invention to these varying uses, means are provided therein to adjust the action of the spring 31. As one form of means to this end, the seat 32 for one end of the spring, Fig. 2, is loosely mounted to the rod 27 and bears upon the top portion of an adjusting screw 33, Fig. 2, said adjusting screw 33 being threaded into the lower end portion 34 of a sleeve 35, which is preferably formed to surround the spring 31 and is detachably threaded at 36 to the lower end portion of the projection 11 of the head.

From the construction thus far described will be apparent that by turning the adjusting screw 33, the tension of the spring 31 may be increased or diminished in accordance with the pressure which it is desired should free the transversely movable plunger as heretofore explained.

In order that the adjustment of the spring may be made to conform to the different pressures desired in the pneumatic tire or receptacle, a pressure scale is provided to indicate the amount of pressure per square inch that must be exerted on the piston 24 to move said piston longitudinally and to unlock the transversely movable plunger or relief valve. Any convenient form of scale may be employed for this purpose but as shown in the drawings the tube 35 is provided with a scale 37 extending longitudinally as indicated in Fig. 4 and the adjusting screw 33, Fig. 2, is attached to a sleeve 38, whereby upon turning movement of the sleeve 38 the screw 33 will be turned to adjust the tension of the spring 31 and the scale 37 will indicate the air pressure which must be exerted on the piston 24 to unlock the transversely movable plunger. The scale 37 in connection with the sleeve 38 may be formed as a micrometer or other character of gage, the purpose being that the scale shall accurately indicate the adjustment of the spring and the air pressure required for such adjustment to permit the relief of the tire from further inflation of air. The tubes 34—35 form convenient means for manipulating the device of the present invention and serve as a handle to permit the device to be held in position for attachment to the valve cylinder of the tire as indicated in Fig. 1.

From the construction described it will be noted that when the head 5 is connected to the inlet opening of a tire or other receptacle and also to a source of fluid pressure supply that such fluid pressure will be transmitted through the passage-way 6 into the tire or receptacle and will also be exerted upon the top of the piston 24. When, however, the fluid pressure has reached the predetermined pressure in the tire or other receptacle as indicated by the adjustment of the spring 31 in the manner hereinbefore described the piston 24 will be moved to the left, Fig. 3, and the transversely movable plunger will be freed from this locking control to establish connection between the atmosphere and the passage-way 6, through the passage-way 18.

Various detail changes may be made in features of the construction without departing from the true spirit of the invention as pointed out by the claims.

The action of the piston 24 under the pressure of the fluid in the chamber 12 is sensitive and when once the device is placed in position for use and the fluid pressure started therethrough, the attendant may withdraw his attention and turn to other work in hand, with confidence that when the tire shall have reached the predetermined degree of inflation, further inflow of fluid thereto will be automatically stopped.

It may sometimes happen that the tension of the spring 31 will vary in use so that the scale 37 as established might not be absolutely accurate, or in placing another spring of somewhat different tension in the place of the established scale might not be appropriate. To overcome this objectionable condition in either case means are being provided to adjust the tension of the spring irrespective of the scale adjustment so that regardless of variation in the spring tension due to either long continued use or the substitution of one spring for another the same established scale may still be employed. To this end the seat 28 for the end of spring 31, at the right, Figs. 2 and 3, is preferably connected to the rod 27 by means of screw threads as indicated in said figures, whereby the initial pressure of the spring may be regulated to accord with the usual scale. When thus regulated it is desirable that the full force of the spring 31 shall not be transmitted against the stem 14 of the transversely movable plunger or relief valve, and there is thus provided a washer 39 having an opening large enough for the passage of the end portion 30 of the piston 24, but too small for the larger portion 29 of the spring seat 28, the construction being such that when the parts are adjusted for use and the relief valve is locked in closed position as indicated by Fig. 3 the part 29 of the spring seat will bear upon the face of the washer and relieve the stem of the relief valve 13 from the stress of the spring.

What is claimed is:—

1. A pressure transmitting controller for automobile tires, comprising a head having a passageway for the transmission of air pressure, means for connecting said passageway with the tire to be inflated and with a source of air pressure, a valve chamber communicating with said passageway, a pressure relief valve associated with said chamber and adapted to be opened to relieve the air pressure therein, and a lock normally acting to positively hold the relief valve in closed position and acting automatically when the air pressure in said chamber reaches a predetermined amount to unlock said valve and permit it to open.

2. In a device of the character described, the combination of a head having a passageway for the transmission of air, means for connecting the passageway to a source of air-pressure supply and to a receptacle to be supplied with air pressure, a valve chamber communicating with said passageway, a relief valve movable longitudinally in said valve chamber, a lock movable transversely to the relief valve movement and normally acting to hold the relief valve closed, said lock having a head to receive the air pressure in the valve chamber and acting automatically to free the relief valve when the air pressure has reached a predetermined amount.

3. In a pressure transmitting controller, the combination of a head having a passageway adapted to transmit air pressure from a source of supply to a receptacle to be supplied, a valve chamber communicating with said passageway, a pressure relief valve associated with said chamber and adapted to be opened by the air pressure in said chamber, a lock normally acting to hold the relief valve closed and acting automatically when the pressure in said chamber reaches a predetermined amount to unlock said valve and permit it to open.

4. In a pressure transmitting controller, the combination of a head having a passageway for transmitting air pressure from a source of supply to a receptacle to be supplied, said head also having a valve chamber the wall of which is provided with a passageway smaller than and communicating with the passageway in the head, a relief valve associated with said chamber, and locking means normally holding the relief valve closed and acting automatically when the pressure in the valve chamber reaches a predetermined amount to permit said relief valve to open.

5. A pressure transmitting controller, comprising a head having a passageway for the transmission of air pressure from a source of supply to a receptacle to be supplied and a valve chamber communicating with said passageway, a relief valve in said chamber, a yielding lock for normally holding the relief valve closed and acting automatically when the air pressure in the said chamber reaches a predetermined amount to free the valve to movement, and means for adjusting the yieldability of the lock.

6. A pressure transmitting controller, comprising a head having a passageway for the transmission of air pressure from a source of supply to a receptacle to be supplied and a valve chamber communicating with said passageway, a valve in said chamber having an air passage, a lock normally acting to hold the said valve in position with said air passage closed and acting automatically when the air pressure in said chamber has reached a predetermined amount to free said valve and permit it to establish communication between said passageway and the outside air through said air passage.

7. A pressure transmitting controller, comprising a head having a passageway for the transmission of air pressure from a source of supply to a receptacle and a valve chamber communicating with said passageway, a valve in said chamber having a stem provided with a relief air passage, a locking device, a spring acting through said locking device to hold the valve in closed position and adapted to yield when the air pressure in said chamber reaches a predetermined amount to free said valve that it may establish communication between said passageway and the outside air through said relief air passage.

8. A pressure transmitting controller, comprising a head having a passageway for the transmission of air pressure from a source of supply to a receptacle and a valve chamber communicating with said passageway, a valve in said chamber having a stem provided with a relief air passage, a locking device, a spring acting through said locking device to hold the valve in closed position and adapted to yield when the air pressure in said chamber reaches a predetermined amount to free said valve that it may establish communication between said passageway and the outside air through said relief air passage and means to adjust the spring.

9. In a device of the character described the combination of a head having a passageway for transmitting air pressure from a source of supply to a receptacle, a valve chamber, a relief valve having a stem extending through the side of said head, said stem having an enlarged portion, a yielding washer interposed between the head and said enlarged end portion, a yielding lock acting normally to hold said valve in closed position with the enlarged end portion of the stem pressed against said yielding washer and acting automatically when the air pressure in said chamber reaches a predetermined amount to unlock said valve and permit the escape of air from said chamber.

10. In a device of the character described, the combination of a head or casing having a passageway for the transmission of air pressure from a source of supply to a receptacle, a valve chamber communicating with said passageway, a relief valve, a rod having a locking portion to normally hold the relief valve in closed position, a spring to hold the said locking portion in locking position and yielding when the pressure in said chamber reaches a predetermined amount to permit the relief valve to open, and means for varying the action of the spring.

11. A pressure transmitting controller, comprising a head having a passageway for the transmission of air pressure from a source of supply to a receptacle, a valve chamber communicating with said passageway, a relief valve having an air passage, a vent establishing air communication between said passage and valve chamber, and a lock to hold the relief valve normally in closed position and acting automatically to free said valve when air pressure in the said chamber reaches a predetermined amount.

12. A pressure transmitting controller, comprising a head having a passageway for the transmission of air pressure from a source of supply to a receptacle, a valve chamber and relief valve communicating with said passageway, said head having a projecting portion provided with a chamber, a piston and lock movable in said projecting portion, a rod carrying said piston and lock and a spring acting to hold the piston and lock in locking position and permitting the same to automatically move to unlocking position when the air pressure in the said chamber reaches a predetermined amount.

13. A pressure transmitting controller, comprising a head having a passageway for the transmission of air pressure from a source of supply to a receptacle, a valve chamber and relief valve communicating with said passage way, said head having a projecting portion provided with a chamber, a piston and lock movable in said projecting portion, a rod carrying said piston and lock and a spring acting to hold the piston and lock in locking position and permitting the same to automatically move to unlocking position when the air pressure in the said chamber reaches a predetermined amount and means to adjust the tension of the spring.

14. A pressure transmitting controller, comprising a head having a passageway for the transmission of air pressure from a source of supply to a receptacle, a valve chamber and relief valve communicating with said passageway, said head having a projecting portion provided with a chamber, a piston and lock movable in said projecting portion, a rod carrying said piston and lock and a spring acting to hold the piston and lock in locking postion and permitting the same to automatically move to unlocking position when the air pressure in the said chamber reaches a predetermined amount and a casing connected to the head and surrounding the spring.

15. In a pressure transmitting controller, the combination of a head having a passageway adapted to be connected to a source of air supply and a receptacle to be supplied, a valve chamber and relief valve, a rod carrying a piston and lock, a spring for normally holding the lock in engagement with the relief valve with the latter in closed position, an adjusting screw for varying the action of the spring, and a two part casing inclosing the spring and serving to turn the adjusting screw.

In testimony whereof we have signed our names to this specification in the presence of two subscribing witnesses.

FRANCIS E. MILLS.
EDWARD F. MILLS.

Witnesses:
 FLORENCE M. McCLOSKEY,
 E. B. TOMLINSON.